Feb. 5, 1935. C. E. HAGLER ET AL 1,989,751
APPARATUS AND METHOD FOR DRYING COTTON
Filed Jan. 26, 1933 5 Sheets-Sheet 1
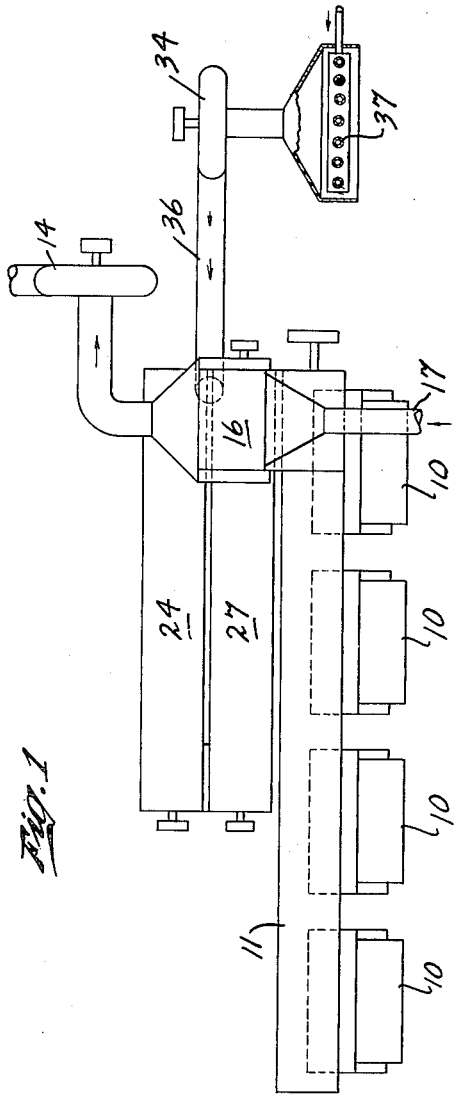
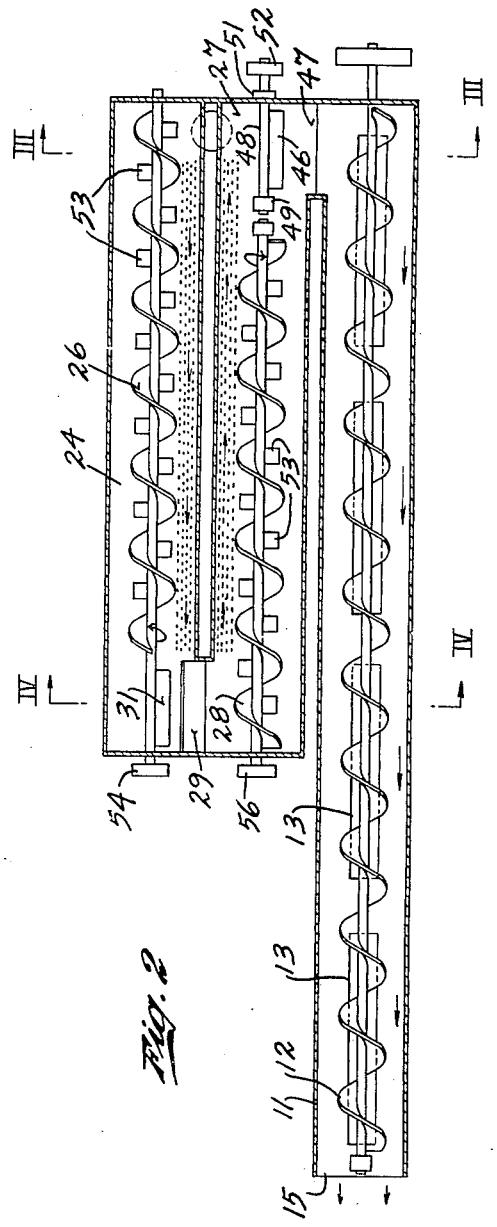
INVENTORS
C. E. Hagler
A. W. Merkel
BY
Johnston & Jennings
ATTORNEYS

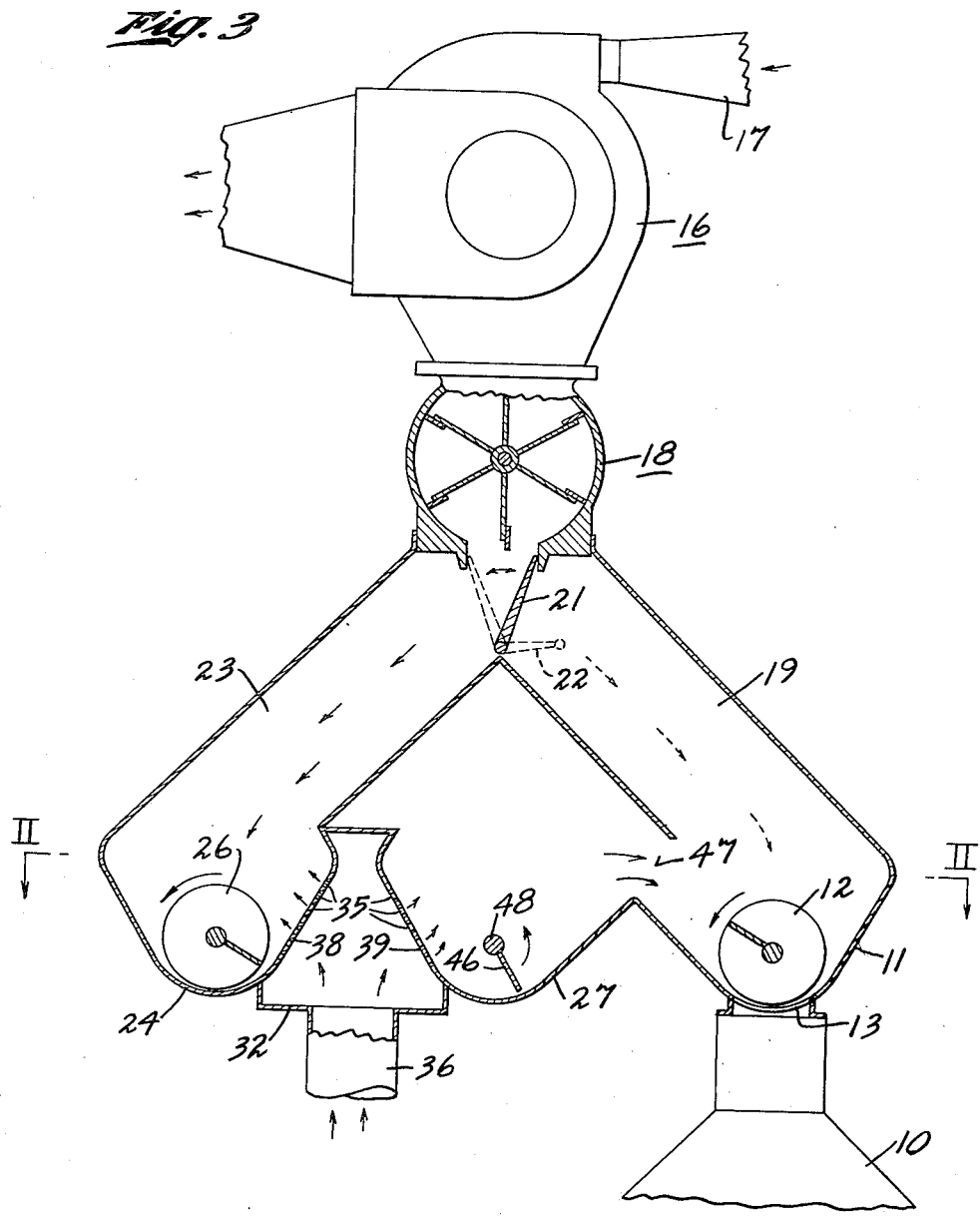

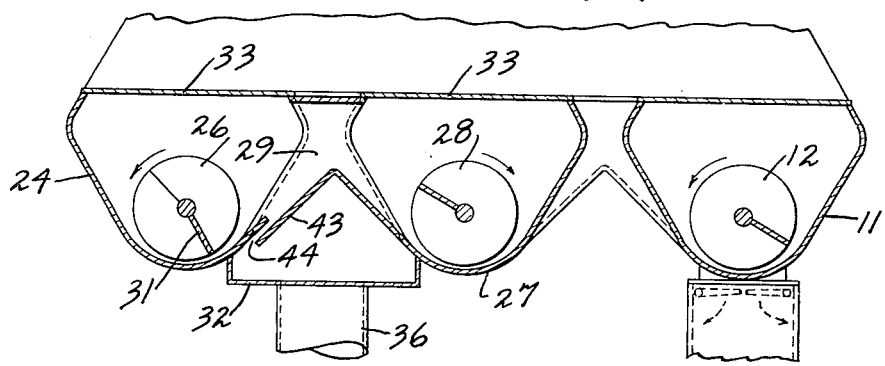
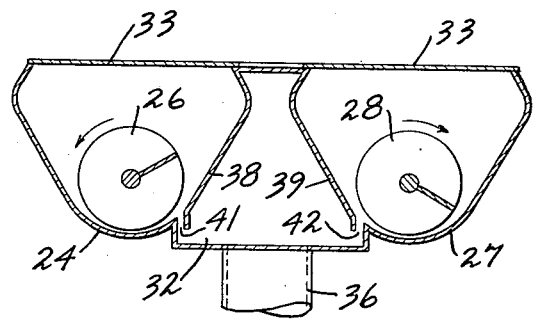

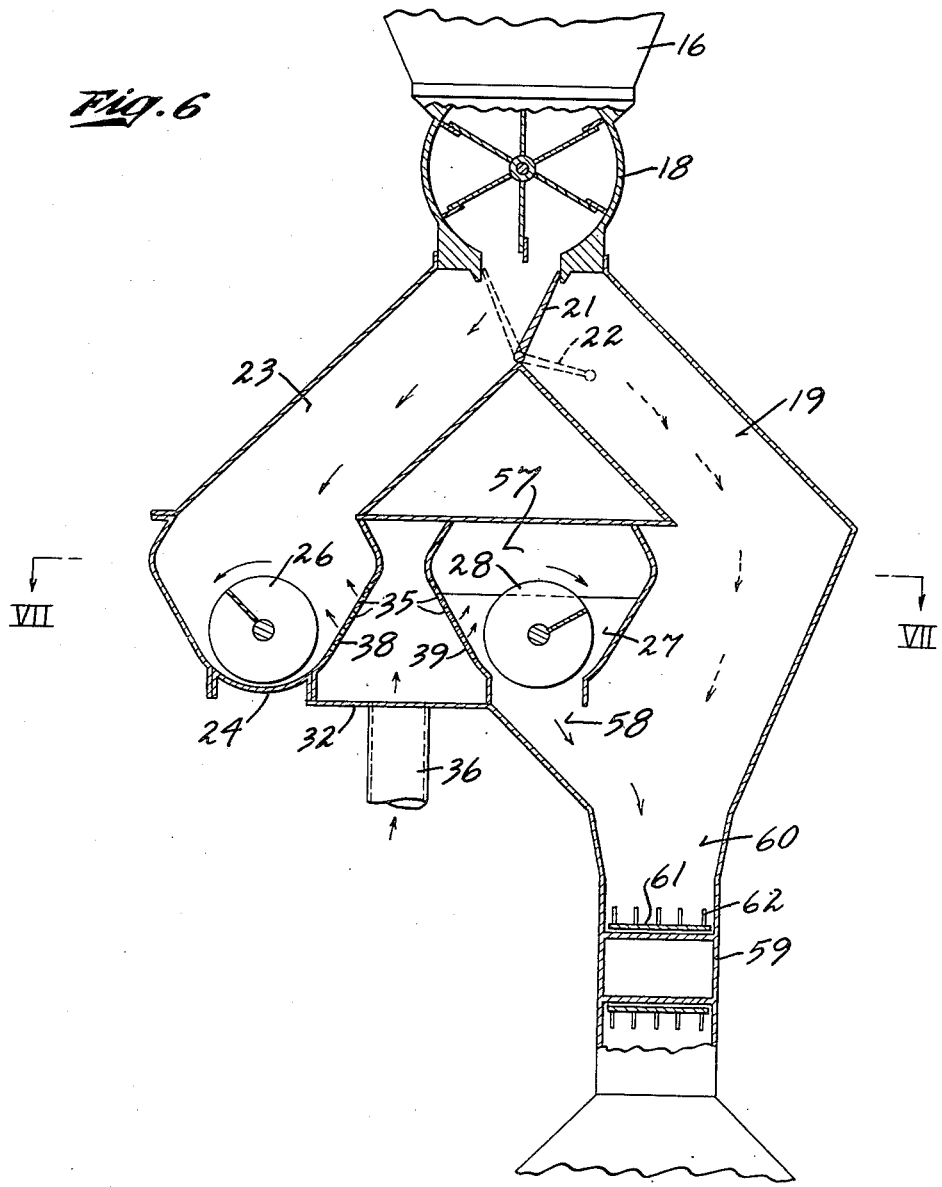

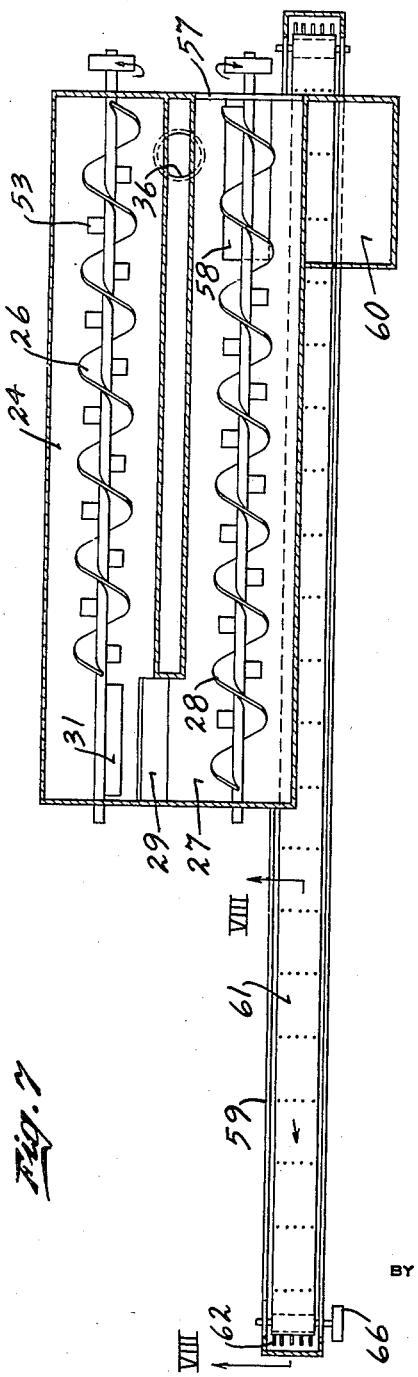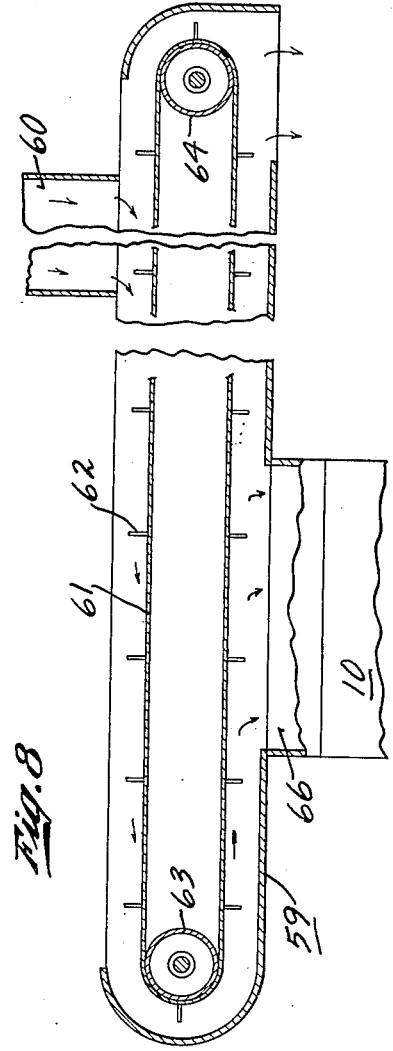

Patented Feb. 5, 1935

1,989,751

UNITED STATES PATENT OFFICE 1,989,751

APPARATUS AND METHOD FOR DRYING COTTON

Clyde E. Hagler and Arthur W. Merkel, Birmingham, Ala., assignors to Continental Gin Company, a corporation of Delaware Application January 26, 1933, Serial No. 653,644

7 Claims. (Cl. 34—45)

Our invention relates to cotton driers, and has for its object the provision of a drying apparatus which may be operated in connection with the cotton supply to gins.

Another object of our invention is to provide a cotton drier which shall embody a minimum of working parts, shall be sturdy and reliable in operation, and which shall have a maximum efficiency whereby cotton may be dried ready for ginning in a minimum of time.

Heretofore, where cotton has been dried before ginning, it has been the custom to provide a drying apparatus separate and apart from the ginning apparatus, and the wet cotton arriving at the gin was first put through a collection and separating apparatus and then through a drier. After being dried, it was then again collected and separated and delivered to a distributor where it was fed to the several gins. It is one purpose of our invention to do away with one of the collection and separating apparatus heretofore used, by interposing between the collection and separating apparatus, a drying apparatus, whereby the cotton, if wet, may be passed through the drying apparatus before being delivered to the distributor. We provide means for diverting cotton directly to the distributor from the separator, in event it does not need drying, and in such case the drier is not operated.

Our invention contemplates the employment of an enclosed mechanical conveyor assembly through which the cotton is conveyed while being dried, and which may conveniently dry the cotton while it is being fed from a wagon to the gins. A hot air box is associated with the conveyor assembly in such a way that heated air under a slight pressure above atmospheric is supplied to the hot air box and has free access to the conveyor assembly so that the moisture is removed from the cotton during its travel through the conveyor assembly. Preferably we employ screw conveyors for carrying the cotton along and so dispose the hot air box and the communicating means between the hot air box and the conveyor, that the air entering the conveyor enclosure is caused to pass through the stream of the cotton and remove the moisture therefrom.

More specifically, our invention contemplates the employment of a plurality of enclosed screw conveyors with a hot air box disposed between the adjacent enclosures, so that the sides of the conveyor troughs form opposing sides of the hot air box, and the conveyors are so disposed and arranged that the cotton is caused to travel along the sides adjacent the hot air box. Communicating means between the hot air box and the conveyor may be in the form of perforations in the common wall, or by openings arranged along the lower side of the conveyor troughs adjacent the hot air box whereby the heated air is caused to travel through the major portion of the stream of cotton as it travels along the conveyor troughs.

Where a pair of parallel troughs are employed, the cotton travels the length of one trough and means are provided for delivering it into the other trough where it is carried back to the end of that trough adjacent the initial starting point. From thence the cotton may well pass to a distributor where it is distributed to a plurality of gin feeders, and the hot air employed in drying the cotton in the first mentioned conveyor trough may be employed for further drying effect on the cotton while in the distributor.

Apparatus embodying features of our invention is illustrated in the accompanying drawings forming a part of this application, in which Fig. 1 is a plan view of a gin assembly having our improved drying unit associated therewith;

Fig. 2 is a sectional plan view of the conveyor troughs and conveyor-distributor employed with our invention, said view being taken along the line II—II of Fig. 3;

Fig. 3 is a sectional view of the apparatus taken along the line III—III of Fig. 2;

Fig. 4 is a sectional view taken along the line IV—IV of Fig. 2;

Fig. 5 is a sectional view of the drier troughs and showing a modified means for admitting hot air to the drier trough;

Fig. 6 is a view similar to Fig. 3, showing a modified form of our invention;

Fig. 7 is a sectional view taken along the line VII—VII of Fig. 6; and

Fig. 8 is a sectional view taken along the line VIII—VIII of Fig. 7.

Referring now to the drawings for a better understanding of our invention, we show in Fig. 1 a plurality of gins 10 to which cotton is supplied from a conveyor-distributor embodying a conveyor trough 11 having disposed therein a screw conveyor 12 rotating in the direction indicated by the arrow in Fig. 2. The cotton is delivered to the gins 10 from the trough 11 through openings 13 in the bottom of the trough, as is well understood.

Cotton is supplied by means of a suction fan 14 acting through a well known form of separator 16, drawing the cotton from a suitable source through a conduit 17 to the separator 16, from which it passes through a feeder 18. If the cotton is dry enough to be handled by the gin, after passing the feeder 18, it is delivered down a chute 19 to the distributor conveyor trough 11, from whence it passes to the gin, as already described. The end of the conveyor trough 11, remote from the separator 16, is left open at 15 for the escape of air, as will hereafter be explained.

In event the cotton is too wet for ginning, it is diverted from the feeder 18 by means of a deflector valve 21 operated by a suitable handle 22 extending outwardly through the end of the casing, down a chute 23 into a conveyor trough 24 having disposed therein a screw conveyor 26 adapted to move the cotton along the trough to its opposite end. Disposed alongside the conveyor trough 24 is a second conveyor trough 27 having disposed therein a screw conveyor 28. The trough 24 is provided with a lateral opening 29 at its delivery end through which cotton is delivered into the conveyor trough 27 by means of a paddle 31 attached to the screw conveyor shaft, whereby to throw the cotton over into the trough 27.

Disposed beneath the troughs 24 and 27, and joined thereto at the bottom, is a hot air box 32, the adjacent sides of the troughs 24 and 27 forming side walls for the hot air box, and the two troughs are provided with a cover 33 whereby to prevent the escape of heated air from the conveyor troughs while the cotton is being dried.

Heated air is supplied to the hot air box 32 from a fan 34 through a conduit 36. The air may be conveniently heated on its way to the fan by passing it over a suitable number of steam heating elements 37.

Communication between the hot air box 32 and the conveyor troughs 24 and 27 may conveniently be had by perforations 35 along the adjacent walls 38 and 39 of the conveyor troughs, as shown in Fig. 3, or by providing openings 41 and 42 extending along the lower part of the adjacent sides of the conveyor trough, as shown in Fig. 5. Either method will provide a maximum contact of the heated air with the stream of cotton, as will be hereafter explained. As will be seen in Fig. 5, the openings 41 and 42 form nozzles directing the heated air upwardly adjacent the walls 38 and 39.

At the delivery end of the conveyor trough 24, we provide a deflector shield 43 between the two troughs, shown in Fig. 4, spacing the end of the deflector shield adjacent to trough 24, from the trough, whereby to provide a nozzle 44 for air from the hot air box 32 to aid the paddle 31 in delivering the cotton into the conveyor trough 27.

The screw 28 in the trough 27 is adapted to convey the cotton along the trough to the opposite end where it is struck by the paddle 46 and delivered over into the conveyor-distributor trough 11 through an opening 47, as shown in Fig. 3. The heated air moving with the cotton toward the conveyor-distributor trough 11, aids in carrying the cotton over into the conveyor-distributor trough.

The paddle 46, as shown in the drawings, is rotated in a direction opposite to the screw conveyor 28, and is accordingly provided with an independent shaft 48 mounted in bearings 49 and 51 driven by any suitable means, such as a pulley 52. In order that the cotton shall have the greatest possible exposure to the heated air passing into the conveyor troughs 24 and 27, we preferably provide stirring blades 53 which are mounted between the flights of the screw conveyors and secured to the conveyor shafts by any suitable means, such as by welding.

In order that the maximum drying effect be obtained, it is important that the stream of the cotton be carried along the walls 38 and 39 of the conveyor troughs 24 and 27, which are adjacent to the hot air box 32. This may be accomplished, by way of example, with an installation such as is shown in Fig. 2, by forming the conveyors 26 and 28 with left hand flights and rotating them in the direction shown by the arrows.

The conveyor 26 is driven by means of a pulley 54, from any suitable source of power, in the direction indicated by the arrow in Fig. 2, and this causes the stream of cotton in the trough 24 to be carried along the wall 38 of the conveyor trough, as shown in Fig. 3, for reasons well understood.

The conveyor 28 is driven by pulley 56, from any suitable source of power, in the direction shown by the arrow in Fig. 2, and this causes the stream of cotton moving along the trough 27 to be carried along the wall 39.

As the stream of cotton is carried along the walls 38 and 39, it is engaged by the agitating elements 53 and is thereby brought in intimate contact with the heated air. The walls 38 and 39 being perforated, as shown in Fig. 3, or openings along the bottom of these walls being provided, as shown in Fig. 5, the hot air entering the troughs 24 and 27 is caused to pass immediately through the stream of cotton travelling along adjacent the walls.

With the arrangement shown in Figure 5, it will be seen that the heated air passes upwardly from the openings 41 and 42 through the mass of cotton being carried along the walls 38 and 39 thereby insuring intimate contact between the streams of air and the cotton, and exerting a loosening effect on the cotton.

The discharge end of the conveyor-distributor trough 11 is provided with the opening 15 so that the moisture laden heated air travelling with the cotton finally escapes from the end of the conveyor-distributor trough.

Referring now to Figs. 6 to 8, inclusive, of the drawings, we show a modified form of our invention in which the moisture laden heated air, after passing through the conveyor troughs 24 and 27, is discharged directly to the atmosphere without passing through the distributor. Such an installation may be desirable from a standpoint of economy, as it is not essential that the distributor be covered, and also will be found to be desirable where a belt type distributor is employed. Furthermore, it insures full separation of the moisture laden air from the cotton before it enters the gins.

In accordance with this modification, we mount the screw conveyor troughs 24 and 27 above the distributor and provide an opening 57 in the casing at the delivery end of the trough 27, whereby the heated air escapes directly to the atmosphere after passing through the troughs 24 and 27. In the bottom of the conveyor trough 27, at the delivery end, we provide an opening 58 through which the cotton falls by gravity down a chute 60 into a distributor casing 59.

The distributor shown in this modification is of the well known belt type, comprising a belt 61 having spaced conveyor elements 62 thereon. The belt is mounted on rollers 63 and 64 disposed at opposite ends of the distributor 59, and may be driven by means of a pulley 66. Cotton falling from the delivery end of the screw conveyor trough 27 falls on to the belt 61 and is conveyed to the opposite end of the casing, as indicated by the arrows, and is carried back along the lower part of the casing by the conveyor elements 62 to be distributed to the gins 10 through openings 66 in the bottom of the distributor.

It will be obvious, however, that a screw type distributor, such as is shown in Figs. 2 and 3 of the drawings, may be employed with the modification shown in Figs. 6 to 8, inclusive, the selection of the particular type of distributor being a matter of choice. By the modification shown in Figs. 6 to 8, inclusive, we show a means whereby the moisture laden heated air may be entirely separated from the cotton before it enters the gins.

From the foregoing description, the operation of apparatus made in accordance with our invention will be readily understood. Where dry cotton is brought to a gin, the valve 21 is turned to the left, as shown in Fig. 3 of the drawings, so that the cotton is delivered directly to the distributor trough 11 to be distributed to the gins. If, however, the cotton is too wet to be ginned, the valve 21 is turned to the right and the wet cotton is delivered into the receiving end of the conveyor trough 24 and dry heated air is supplied to the hot air box 32 between the two conveyor troughs 24 and 27.

The flights of the screw conveyor 26 are so arranged, and the conveyor is run in such a direction, that the stream of the cotton is carried along the wall 38 of the trough 24 to the delivery end of the trough while being subjected to a circulation of heated air through the wall 38.

On reaching the delivery end of the trough 24, the cotton is transferred by means of the paddle 31 and the nozzle 44 over the deflector shield 43 into the receiving end of the trough 27 and is then carried to the opposite or delivery end of the trough 27. The flights of the conveyor 28 are so arranged and the rotation of the conveyor is such that the stream of the cotton is carried along the wall 39 of the trough 27 to the delivery end of that trough, and during its travel along the trough it is subjected to the dry heated air passing through the wall 39.

When the cotton reaches the delivery end of the screw conveyor trough 27, it is delivered into the distributor casing.

In accordance with the showing of Figs. 1 to 4, the cotton is delivered from the trough 27 by means of a paddle 46 along with the heated air into the distributor trough 11, and travels along the trough with the cotton to the open end 15 of the trough 11, where it escapes to the atmosphere. In accordance with the modification shown in Figs. 6 to 8, inclusive, the moisture laden heated air is discharged to the atmosphere through the opening 57 in the delivery end of the conveyor trough 27, and the dried cotton falls by gravity through the opening 58 down the chute 60 into the distributor trough 59, from whence it is distributed to the gins.

During its travel along the troughs 24 and 27, as just described, the agitating elements 53 perform an important function. The action of the conveyors 26 and 28 causes the stream of cotton to be carried along the walls 38 and 39. This stream of cotton is caught by the agitating elements 53 between the flights of the conveyors and is caused to be thrown through the dry hot air in its travel. The streams of air passing through the walls 38 and 39 accordingly come into immediate, intimate contact with all portions of the stream of cotton, thereby thoroughly drying the cotton during its travel. The agitating elements 53 also serve to break up the stream of cotton as they rotate it, thus permitting freer access of the air to the interior of the stream.

In event the cotton is very wet, so that sufficient of the moisture can not be removed therefrom for the cotton to be ginned in one pass through the drier, the gins 10 are not run and the cotton may be delivered out through the open end 15 of the distributor on to the floor of the gin, where it may again be collected by means of the suction conduit 17 and again passed through the separator 16 and the drier, as heretofore described. We thus provide means for continuous treatment of the cotton, if necessary, until it is thoroughly dry, though ordinarily a single pass through the drying apparatus will remove all moisture necessary.

From the foregoing, it will be apparent that we have devised an improved cotton drier which is simple and sturdy of construction, reliable in operation, and one which may conveniently be associated with cotton gins so as to dry the cotton while it is being delivered to the gins. We have found our improved drier extremely efficient in operation, removing sufficient moisture from the cotton during its travel through the conveyor troughs to allow the gins to handle it satisfactorily.

A further advantage of our improved apparatus will be observed in the arrangement of the troughs 24 and 27 in the same horizontal plane, whereby a minimum of head room is required, the air box can be interposed between the two conveyor troughs, and the conveyor so run that the major portion of the bulk of the cotton in the troughs is exposed directly to the currents of heated air entering the troughs transverse to the direction of movement of the cotton. The parallel arrangement of the troughs 24 and 27, with the arrangement of the hot air box 32 between them, also greatly reduces the total space occupied by the drying apparatus and provides an exceedingly compact efficient design.

While we have shown our invention in but two forms, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:

1. In a cotton drier, the combination of a pair of parallel enclosed screw conveyors, an enclosing means extending across between the lower part of the two conveyor troughs to form a hot air box therebetween, one wall of each trough forming a wall of the hot air box and being provided with openings into the conveyor troughs, means for supplying dry heated air under pressure to the hot air box, and means for conveying cotton along the troughs.

2. In a cotton drier, the combination of a pair of parallel enclosed screw conveyor troughs, an enclosing means extending across between the lower part of the two troughs to form a hot air box therebetween, one wall of each trough forming a wall of the hot air box and being provided with openings into the troughs, means for supplying dry heated air under pressure to the hot air box, means for delivering cotton into one end of one of said troughs, a conveyor in each of said troughs, means for driving the first conveyor to move the cotton from end to end of its trough, means for transferring the cotton from the delivery end of said trough into the adjacent end of the second of said conveyor troughs, means for driving the second of said conveyors to convey the cotton to the opposite end thereof, and means for delivering cotton and air from the opposite end of said second conveyor.

3. In a cotton drier, a screw conveyor trough having an elongated slot along the lower side of a wall thereof, a hot air box extending alongside and joined to the trough and communicating therewith through said slot, nozzle means in the hot air box for directing currents of air upwardly through the slot, a screw conveyor in the trough driven in a direction to cause the stream of cotton to travel along the wall communicating with the hot air box, and means for supplying the hot air box with heated air under pressure.

4. In a cotton drier, the combination of a pair of parallel enclosed screw conveyors lying in the same horizontal plane, means for delivering cotton into one end of one of said conveyors to be carried to the opposite end thereof, a paddle means at the end of said conveyor for delivering cotton laterally from said opposite end thereof into the adjacent end of the other of said conveyors, a second paddle means at the end of said last mentioned conveyor for delivering cotton laterally from the delivery end thereof, means for directing streams of heated air upwardly through the cotton as it is conveyed along the troughs, and air nozzles for aiding the paddles in delivering cotton laterally from the conveyors.

5. In a cotton drier, a covered conveyor trough having an elongated opening extending along one side at the bottom thereof, means for feeding cotton into one end of the trough to be conveyed therealong while being dried, a screw conveyor in the trough driven in a direction to cause the cotton being dried to travel along the wall above the opening, a hot air box extending along the trough and communicating with the opening, the sides of the opening being formed to provide a nozzle directed upwardly along the side of the conveyor trough, and means to supply the hot air box with heated air under pressure.

6. In a cotton drier, a screw conveyor assembly comprising an enclosed screw conveyor trough horizontally disposed and having a lateral delivery opening, a screw conveyor shaft and conveyor in the trough, means for feeding cotton into one end of the trough to be conveyed to the other end, means for passing streams of heated air under superatmospheric pressure upwardly through the cotton during its travel along the trough, a rotary paddle at the delivery end of the conveyor trough for discharging cotton through the delivery opening, and an air nozzle communicating with the hot air box and disposed to aid the paddle in delivering cotton through the lateral opening.

7. In a cotton drier, a screw conveyor assembly comprising an enclosed screw conveyor trough horizontally disposed and having a lateral delivery opening, a screw conveyor shaft and conveyor in the trough, means for feeding cotton into one end of the trough to be conveyed to the other end, means for passing streams of heated air under superatmospheric pressure upwardly through the cotton during its travel along the trough, a rotary paddle at the delivery end of the conveyor trough for discharging cotton through the delivery opening, a second screw conveyor assembly mounted in the same horizontal plane as the first mentioned assembly and extending parallel thereto, said second assembly being adapted to receive cotton from the first assembly and return it toward the receiving end of the first assembly, means for passing streams of heated air under superatmospheric pressure upwardly through the cotton, the conveyor trough of the second assembly having a lateral discharge opening, a rotary paddle for discharging cotton from the lateral opening of the second assembly, and air nozzles communicating with the hot air box and disposed to aid the paddles in discharging cotton through the lateral openings.

CLYDE E. HAGLER.
ARTHUR W. MERKEL.